N. MIRONCHUK.
MEAT ROASTER.
APPLICATION FILED JUNE 24, 1920.
1,386,643.
Patented Aug. 9, 1921.
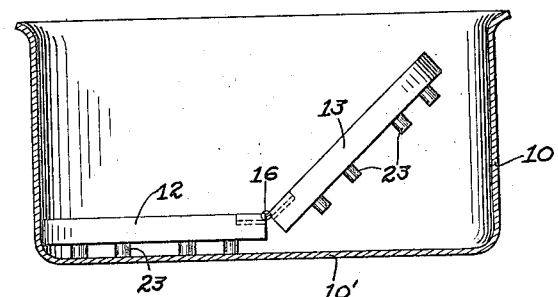
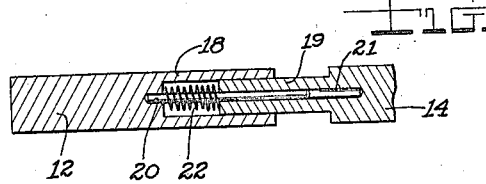
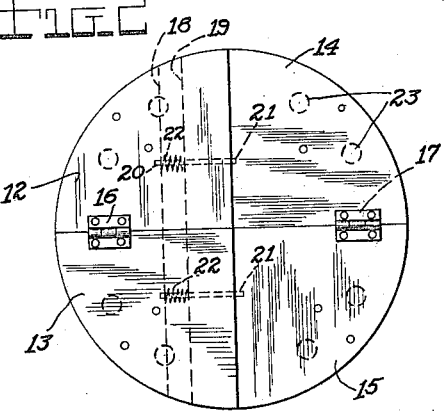
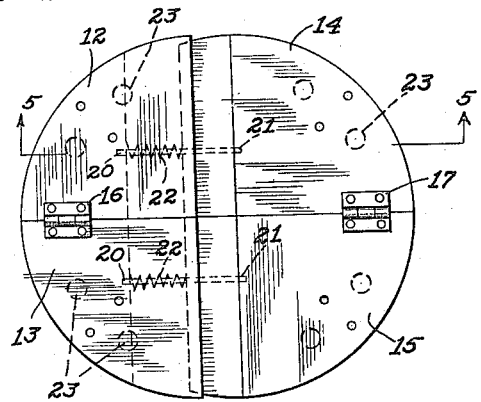
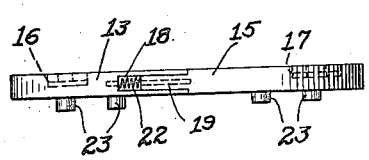
INVENTOR.
Nestor Mironchuk
BY George C. Heinicke
ATTORNEY.

UNITED STATES PATENT OFFICE.

NESTOR MIRONCHUK, OF NEW YORK, N. Y.

MEAT-ROASTER.

1,386,643.        Specification of Letters Patent.        Patented Aug. 9, 1921.

Application filed June 24, 1920. Serial No. 391,283.

*To all whom it may concern:*

Be it known that I, NESTOR MIRONCHUK, a citizen of Russia, residing at New York, county of New York, and State of New York, have invented certain new and useful Improvements in Meat-Roasters, of which the following is a specification.

This invention relates generally to cooking utensils and more particularly to a device whereby pots, pans or like utensils may be provided with an extra bottom partition having a space thereunder to prevent burning of the article being roasted by contact with the bottom of the pan.

The invention has for an object to provide a device of this kind which may be easily applied to or removed from any ordinary pan or pot used in roasting meat presenting a variable superficial area whereby it may be used in connection with pots of different size, a further object relating to the provision of a movable portion adapted to swing outwardly away from the permanent bottom to permit of discharge of semi-solid accumulations from the space thereunder.

For further comprehension of the invention, and of the objects and advantages thereof, reference will be had to the following description and accompanying drawings, and to the appended claims in which the various novel features of the invention are more particularly set forth.

Figure 1 of the drawings is a side elevation of a device embodying the invention, showing it in position in a cooking pot, the latter being shown in axial section.

Fig. 2 is a plan view of the device showing it contracted to its smallest area.

Fig. 3 is a side elevation of the device this view being at right angles to Fig. 1.

Fig. 4 is a similar view to Fig. 2 showing the device expanded to present a larger top surface.

Fig. 5 is an enlarged fragmentary vertical section taken on the line 5—5 of Fig. 4.

In Fig. 1 of the drawings 10 indicates in general a cooking pot of ordinary construction and 10′ the bottom thereof, my improved device being in the form of a removable plate resting upon and spaced from the bottom 10′. This plate is here shown as of circular shape when contracted to its smallest area, assuming an approximately oval form when expanded, and being divided into approximately quadrantal sections, the sections on one side of a given diametric line being hinged to the ones on the opposite side thereof while each pair of hinged sections has a sliding connection with the other pair whereby they are adjusted toward and away from one another.

These quadrantal sections are numbered 12, 13, 14 and 15 respectively, the section 12 being connected by a hinge 16 to the section 13 and section 14 being connected by a hinge 17 to the section 15. Formed in the diametrical edge presented by the two sections 12 and 13, considered as a unit, is a groove 18 which extends from end to end thereof and is cut inwardly for some distance midway between top and bottom faces. Formed on the adjacent diametrical edge of the two sections 14 and 15 is a tongue 19 which extends from end to end of such edge and fits snugly and slidingly into the groove 18, this tongue projecting a distance from the edge of the sections 14 and 15 somewhat less than the depth of the groove as shown in Figs. 2 and 3.

Fixed in the inner wall of the groove 18 in each section 12, 13 is a pin 20 which projects outwardly through said groove parallel to the axes of the hinges 16, 17, and into registering borings 21 extending through the tongue 19 and a short distance into the bodies of the sections 14 and 15. Expansible coiled springs 22 surround these pins 20 between the inner wall of the groove 18 and the tongue 19 and normally act to press the sections 14 and 15 away from the sections 13 and 14. Each of the sections is provided with a pair of feet 23 whereby the plate is supported at a slight distance above the bottom of the pot.

As will be apparent the device may be expanded or contracted to fit different pots or pans and this expansion or contraction does not interfere with the swinging of the sections 12 and 14 relative to the sections 13 and 15.

The general outline of the device might also be varied to suit any particular type or shape of pot or pan.

Having thus described my invention what I claim as new and desire to secure by Letters Patent of the United States is as follows—

1. A device of the class described comprising a plate divided into quadrantal sections, the sections on opposite sides of a given diametrical line being hinged to one another, each pair of hinged sections being adjustable as a unit toward and away from the other pair of hinged sections.

2. A device of the class described comprising a plate divided into quadrantal sections, the sections on opposite sides of a given diametrical line being hinged to one another the inner edge of one pair of hinged sections presenting a groove extending continuously therealong, the adjacent edge of the other pair of hinged sections presenting a tongue projecting into said groove.

3. A device of the class described comprising a plate divided into quadrantal sections, the sections on opposite sides of a given diametrical line being hinged to one another the inner edge of one pair of hinged sections presenting a groove extending continuously therealong, the adjacent edge of the other pair of hinged sections presenting a tongue projecting into said groove, a pin fixed in each section of one of said hinged pairs and projecting through said groove and into a boring in the adjacent section of the other hinged pair, and expansible coiled springs surrounding said pins in said groove and normally acting to spread the hinged pairs apart.

4. A device of the class described comprising a plate divided into quadrantal sections, the sections on opposite sides of a given diametrical line being hinged to one another the inner edge of one pair of hinged sections presenting a groove extending continuously therealong, the adjacent edge of the other pair of hinged sections presenting a tongue projecting into said groove, a pin fixed in each section of one of said hinged pairs and projecting through said groove and into a boring in the adjacent section of the other hinged pair, and expansible coiled springs surrounding said pins in said groove and normally acting to spread the hinged pairs apart, and feet provided on each of the said sections, whereby the plate may be spaced from the surface on which it rests.

In testimony whereof I have affixed my signature.

NESTOR MIRONCHUK.